US012459158B2

(12) United States Patent
Wildman

(10) Patent No.: US 12,459,158 B2
(45) Date of Patent: Nov. 4, 2025

(54) KNIFE SHARPENING APPARATUS AND METHOD

(71) Applicant: Kenneth A. Wildman, Rochester, NY (US)

(72) Inventor: Kenneth A. Wildman, Rochester, NY (US)

( * ) Notice: Subject to any disclaimer, the term of this patent is extended or adjusted under 35 U.S.C. 154(b) by 844 days.

(21) Appl. No.: 17/492,878

(22) Filed: Oct. 4, 2021

(65) Prior Publication Data

US 2022/0088820 A1 Mar. 24, 2022

Related U.S. Application Data

(63) Continuation-in-part of application No. 16/937,785, filed on Jul. 24, 2020, now Pat. No. 11,229,984.

(51) Int. Cl.

| | |
|---|---|
| ***B27J 1/00*** | (2006.01) |
| ***B24B 3/36*** | (2006.01) |
| ***B24B 19/00*** | (2006.01) |
| ***B24D 15/06*** | (2006.01) |
| ***G10D 9/035*** | (2020.01) |

(52) U.S. Cl.

CPC .................................... *B27J 1/00* (2013.01); *B24B 3/36* (2013.01); *B24B 19/001* (2013.01); *B24D 15/06* (2013.01); *G10D 9/035* (2020.02)

(58) Field of Classification Search

None

See application file for complete search history.

(56) References Cited

U.S. PATENT DOCUMENTS

| | | | | | |
|---|---|---|---|---|---|
| 103,739 | A | | 5/1870 | Hanks | |
| 1,213,339 | A | | 1/1917 | D'Amato | |
| 1,271,930 | A | | 7/1918 | Newhouse | |
| 1,405,019 | A | | 1/1922 | Simard | |
| 1,979,741 | A | | 11/1934 | Hangi | |
| 2,370,908 | A | * | 3/1945 | Llorens | B24D 15/06 451/367 |
| 2,644,279 | A | * | 7/1953 | Stankovich | B24B 41/066 451/380 |
| 2,703,951 | A | * | 3/1955 | Smith | B24B 3/36 451/450 |
| 3,254,456 | A | * | 6/1966 | Clark | B24D 15/065 451/555 |
| 4,043,082 | A | | 8/1977 | Ferroglio | |
| 4,062,111 | A | | 12/1977 | Clark | |
| 4,217,735 | A | * | 8/1980 | McGeoch | B24D 15/06 451/377 |
| 4,229,910 | A | | 10/1980 | McRae | |
| 4,285,253 | A | | 8/1981 | Edling | |
| 4,441,279 | A | | 4/1984 | Storm et al. | |

(Continued)

FOREIGN PATENT DOCUMENTS

| | | | | |
|---|---|---|---|---|
| CN | 2780434 | | 5/2006 | |
| WO | WO-2017200431 A1 | * | 11/2017 | B24D 15/065 |

*Primary Examiner* — Makena S Markman
*Assistant Examiner* — Dana Lee Poon
(74) *Attorney, Agent, or Firm* — Duane C. Basch

(57) ABSTRACT

An apparatus and method for its use employ a magnet assembly to securely hold a knife by its blade. Along with a carriage and angle adjustment assembly that set and control the sharpening angle of the knife relative to a sharpening surface, the apparatus provides for sharpening of knives such as double hollow ground reed scraping knives, and bevel reed scraping knives.

10 Claims, 9 Drawing Sheets

(56) References Cited

U.S. PATENT DOCUMENTS

| | | | | |
|---|---|---|---|---|
| 4,530,188 | A | 7/1985 | Graves | |
| 4,627,194 | A | 12/1986 | Friel | |
| 4,718,200 | A | 1/1988 | Miquelot | |
| 4,719,722 | A | 1/1988 | Washburn | |
| 4,807,399 | A | 2/1989 | Friel | |
| 4,815,209 | A | 3/1989 | Benoist et al. | |
| 4,961,288 | A * | 10/1990 | Ketteringham | B24B 41/066 451/367 |
| 5,005,319 | A | 4/1991 | Friel | |
| 5,185,985 | A | 2/1993 | Dale | |
| 5,209,025 | A | 5/1993 | Martin et al. | |
| 5,458,534 | A | 10/1995 | Campione et al. | |
| 5,462,476 | A | 10/1995 | Bohn | |
| 5,477,753 | A | 12/1995 | Branscum et al. | |
| 5,480,345 | A | 1/1996 | Bethea | |
| 5,547,419 | A * | 8/1996 | Hulnicki | B24B 41/066 451/320 |
| 5,558,572 | A | 9/1996 | Fletcher | |
| 5,700,189 | A | 12/1997 | Farris | |
| 6,071,181 | A | 6/2000 | Wightman et al. | |
| 6,101,898 | A | 8/2000 | Gore et al. | |
| 6,571,878 | B2 | 6/2003 | Mc Daniel et al. | |
| 6,905,403 | B2 | 6/2005 | Stallegger et al. | |
| 6,968,879 | B2 | 11/2005 | Schuh et al. | |
| 7,118,466 | B2 | 10/2006 | Laney | |
| 7,144,310 | B2 | 12/2006 | Longbrake | |
| 7,182,678 | B2 * | 2/2007 | Keska | B24D 15/08 451/367 |
| 7,335,093 | B1 | 2/2008 | Stanley | |
| 7,381,120 | B2 | 6/2008 | Henry | |
| 7,850,134 | B2 | 12/2010 | Tunza | |
| 8,262,438 | B1 | 9/2012 | Allison et al. | |
| 8,292,701 | B2 | 10/2012 | Heng | |
| 8,523,638 | B2 | 9/2013 | Grigsby | |
| 8,915,766 | B1 | 12/2014 | Kolchin | |
| 9,050,709 | B1 | 6/2015 | Dovel | |
| 9,216,488 | B2 | 12/2015 | Allison | |
| 9,393,701 | B2 | 7/2016 | Zanella et al. | |
| 10,131,028 | B1 | 11/2018 | Allison | |
| D866,278 | S | 11/2019 | Watson et al. | |
| 2007/0249269 | A1 | 10/2007 | Swartz | |
| 2008/0017013 | A1 | 1/2008 | Heng et al. | |
| 2010/0203810 | A1 | 8/2010 | Parrish | |
| 2015/0140909 | A1 * | 5/2015 | Stanley | B24B 41/065 29/401.1 |

* cited by examiner

KNIFE SHARPENING APPARATUS AND METHOD

This application is a continuation-in-part of, and claims priority from, co-pending U.S. patent application Ser. No. 16/937,785 for a KNIFE SHARPENING APPARATUS AND METHOD, filed Jul. 24, 2020 by Kenneth A. Wildman, which is hereby incorporated by reference in its entirety.

This disclosure relates generally to a method and apparatus for the sharpening of knives, including knives primarily used for scraping reeds made of cane for musical instruments, particularly woodwinds such as an oboe.

BACKGROUND AND SUMMARY

The oboe is a woodwind musical instrument that requires a double reed to play. This double reed is typically comprised of cane (*Arundo donax*) wrapped on a staple using thread and becomes the mouthpiece which is inserted into the instrument. Oboe reeds have a relatively short lifespan amounting to only several hours of playing time. To enable the reed to play, it is scraped on the outside, typically using a sharp hand knife nominally perpendicular to the surface of the reed, with the knife edge perpendicular to the grain of the cane and the scrape stroke is longitudinal along the grain of the cane. Both sides of the reed and both halves of the reed are scraped equally/symmetrically for best performance. The outside of the double reed is scraped rather than carved because of the thinness required at the tip of the reed (typically between 0.05 mm and 0.02 mm) and also because of the thickness variation and curvature required elsewhere on the reed. Typically, one of two different types of knives is used: (i) a double hollow ground knife with a very low angle between the face and back side of the knife blade at the edge, or (ii) a bevel knife that has up to a 45 degrees angle between the face and lower back side of the knife blade. Both sides of the double hollow ground knife are concave as opposed to standard knives that typically have slightly convex sides near the edge. The concave sides make the double hollow ground knife somewhat different to sharpen than standard knives used for other purposes, especially on the face side of the knife blade. As the reed is scraped (not sliced, carved or cut), it is desirable to have the leading face of the knife blade sharpened at an angle that is extremely close to the side of the blade. The scraping of the reed dulls the edge of the knife relatively quickly such that sharpening of the reed knife, also referred to as honing, is required frequently.

One conventional method of sharpening a knife for scraping double reeds is to sharpen it by hand, which includes free hand control of the angle between the knife blade and the sharpening stone. Typically, when sharpening a double reed knife it is first sharpened on a relatively coarse stone and then on progressively finer stones, with each progression to a finer stone being at a slightly greater angle between the blade and the stone. This is very difficult to control by free hand and often results in either too much angle on the knife blade edge with the finest stone, or a blade edge that is not fine enough because the finest stone did not sharpen the extreme edge of the blade. This sharpening method becomes even more difficult with harder metal knives because the harder metal requires more strokes to sharpen it, which introduces more sharpening angle variability with each stroke. Harder metal knives are desirable because they hold the sharp edge longer while scraping the reed.

A second conventional method of sharpening a knife is by use of a hand operated tool such as that provided by "Wicked Edge" (www.wickededgeusa.com). This method is designed to control the sharpening angle and sharpen a wide variety of cutting knives using a fixed knife blade and movable sharpening stones but the knife blade holder securely clamps both sides of the knife blade, thereby limiting how small the sharpening angle can be between the side of the knife blade and the sharpening stone. Such a tool does not allow a user to set the sharpening angle close enough to the face side of the knife blade to achieve the extremely small angle desired on a knife used for scraping reeds. This minimum angle is important on the face side of the knife blade because the reed knife scrapes the cane rather than slicing or cutting it. The Wicked Edge tool limits a user by limiting the sharpening angles available and it also does not allow the user to use their own sharpening stone(s). The Wicked Edge device only uses sharpening stones sourced from Wicked Edge.

A third conventional method of sharpening a knife is that of a hand operated tool provided by Edge Pro (www.edgeproinc.com). This method is designed to mostly control the sharpening angle and sharpen a wide variety of cutting knives using a movable knife blade and a movable sharpening stone. It makes use of the operator's hand on the knife handle plus an optional magnet to help assist holding the knife blade but the magnet does not securely hold the knife, as a result of the intentional design for the knife blade to move while it is being sharpened. The magnet is an assist to the operator's hand, not a secure holder. The Edge Pro Apex model is limited to sharpening angles of 10 degrees to 24 degrees and the Edge Pro Professional model has a sharpening range of 6 degrees to 33 degrees. Both are OK for sharpening angles on double hollow ground knives if the knife blade is long enough from edge to spine to allow the low angle to clear the Edge Pro's tool's knife support but most double hollow ground knives used for reed making are fairly short so the tool's knife support becomes an issue at the extremely low sharpening angle needed for optimally sharpening double reed knives. The inherent knife movement during the knife sharpening process causes undesirable variability in knife edge quality. Both Edge Pro models are incapable of sharpening either side of a bevel knife. The "Edge Pro" devices only allow for sharpening stones designed specifically for the "Edge Pro" sharpeners and do not allow the user to use their own preference of sharpening stones. The Edge Pro sharpening stones are fairly small and typically wear faster than larger sharpening stones commonly available for sharpening knives, due to the difference in available surface sharpening area.

A fourth conventional method of sharpening a double reed knife is the "Harvard Double Reed" knife sharpener (www.harvarddoublereeds.com), which allows the user to use their own choice of flat sharpening stones but is limited to sharpening only the bevel side of a bevel knife. It cannot be used to sharpen the face side of a bevel knife against a sharpening stone because one of the clamping surfaces to hold the knife blade is the face side of the knife blade. The face side of a bevel knife can be sharpened by hand with the face side lying flat against the sharpening stone but that does not allow for a tightly controlled, very slight angle change/increase when making the normal progression to finer sharpening stones.

Therefore, the need exists for a tool to precisely facilitate a user sharpening both sides of double hollow ground double reed scraping knives and bevel-type double reed scraping knives on the user's preferred sharpening stones or surfaces, with angles set by the user, including angles down to 0 degrees between the side of the knife blade and the surface of a sharpening stone for both types of reed scraping knives (double hollow ground and bevel).

Disclosed in embodiments herein is an apparatus for holding a knife for sharpening, comprising: a carriage for reciprocal movement above a sharpening surface along a longitudinal axis of the sharpening surface; a magnet assembly for securely holding the knife by magnetic attachment to a blade of the knife; and an angle adjustment assembly, operatively connecting the magnet assembly to the carriage, the angle adjustment assembly further enabling the adjustment of a sharpening angle between a second side of the knife blade that is to be sharpened and a flat sharpening surface.

Further disclosed in embodiments herein is a method for holding a knife for sharpening, comprising: placing a carriage adjacent to a sharpening surface, said carriage being suitable for reciprocal movement along a longitudinal axis of, yet above, the sharpening surface; attaching the knife to a magnet assembly to securely hold the knife by magnetic attraction of a first side of the knife blade to the magnet assembly; and using an angle adjustment assembly, said angle adjustment assembly adjustably connecting the magnet assembly to the carriage, to adjust a sharpening angle between a second side of the knife blade that is to be sharpened and a flat sharpening surface.

Figure 1:
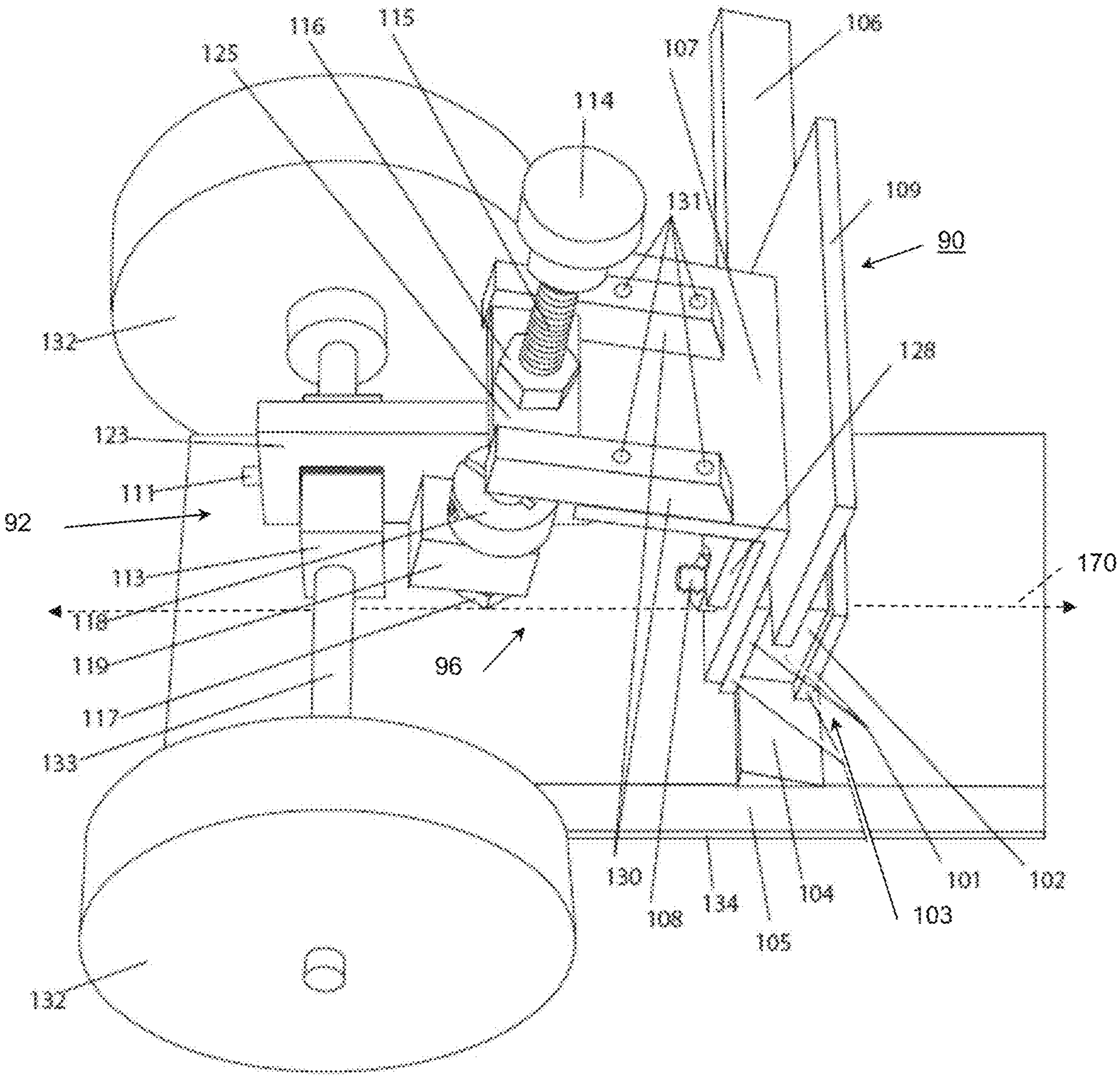
FIG. 1 is a perspective view illustrating an embodiment of the knife sharpening apparatus.

The various embodiments described herein are not intended to limit the disclosure to those embodiments described. On the contrary, the intent is to cover all alternatives, modifications, and equivalents as may be included within the spirit and scope of the various embodiments and equivalents set forth. For a general understanding, reference is made to the drawings. In the drawings, like references have been used throughout to designate identical or similar elements. It is also noted that the drawings may not have been drawn to scale and that certain regions may have been purposely drawn disproportionately so that the features and aspects could be properly depicted.

DETAILED DESCRIPTION

In describing the sharpening apparatus illustrated in the figures, specific terminology will be used for clarity. However, it is not intended that the disclosure be limited to the term(s) selected, and it is understood that the term(s) used includes all technical equivalents which operate in a similar manner to accomplish a similar purpose. For example, the terms "magnet" and "pivot" are used and not limited to any particular type of magnet or any particular type of pivot but include all types of magnets and pivots where other elements are recognized as equivalent by those skilled in the art.

The sharpening apparatus generally depicted in FIGS. 1-5 is suitable for holding a knife for sharpening. While the apparatus and method are described, and the illustrations may include representations of an oboe reed knife, such representations are for purposes of illustration, and are not intended to limit the scope of the disclosure. The apparatus and method may be used with various types of knives.

The sharpening apparatus 90 includes a carriage 92 for reciprocal movement above and along a longitudinal axis of sharpening stone 105, which has a generally planar upper sharpening surface. Apparatus 90 also includes a magnet assembly 103 for securely holding the knife by magnetic attachment to blade 104 of the knife, and an angle adjustment assembly 96, operatively connecting the magnet assembly to the carriage. The angle adjustment assembly further enables the adjustment and setting of a sharpening angle ($\alpha$) between a second side of the knife blade that is to be sharpened and the flat upper sharpening surface of sharpening stone 105.

Referring to FIG. 1, for example, magnet assembly 103 comprises a permanent magnet 102 and two associated end plates 101. The magnet assembly operates to securely hold a steel knife blade 104 in a fixed position in the sharpening apparatus. The magnet 102 is slightly less than 2 inches in length, less than 1 inch in height and approximately 0.4 inches thick, whereas the end plates 101 are 2 inches by 1 inch by 0.12 inches thick. The knife blade 104 sits in the magnet assembly in a way that the magnet assembly magnetically (removably) attracts one side of the blade, but not too close to the sharp edge of the blade. As illustrated in FIGS. 1 and 2A-2C, the rear plate 101 of magnet assembly 103, also contacts and holds along a portion of the back or spine of the knife blade 104. To securely hold the knife for sharpening using the magnet assembly 103, it is not necessary for the end plates 101 of the magnet assembly to contact the entire length (tip to heel) of the blade.

While some knives include blades fabricated from non-magnetic materials (e.g., some stainless steels, titanium, ceramics, etc.), such blades may be sharpened with the disclosed sharpening apparatus 90 by employing an additional magnetic mounting component. One such component is a magnetic blade sleeve, fabricated from spring-steel. The blade sleeve is a U-shaped channel designed to slide over the spine of the knife blade 104, thereby clasping the blade in the channel while providing a magnetic surface for mounting the blade to the magnet assembly 103. An alternative magnetic mounting component is a fixture, made from a flat steel bar, that has a slight pocket on one end for receiving the tip of the knife blade therein and on the other end a threaded adjustment to apply force against the blade heel or the knife handle in order to both hold the blade against the bar while forcing the blade tip to engage the pocket. Both components would be designed in a manner to minimize the extent to which they cover the side of the blade being sharpened. And, further contemplated are magnetic mounting components that may be customized for a particular knife or blade design.

Figure 2A:
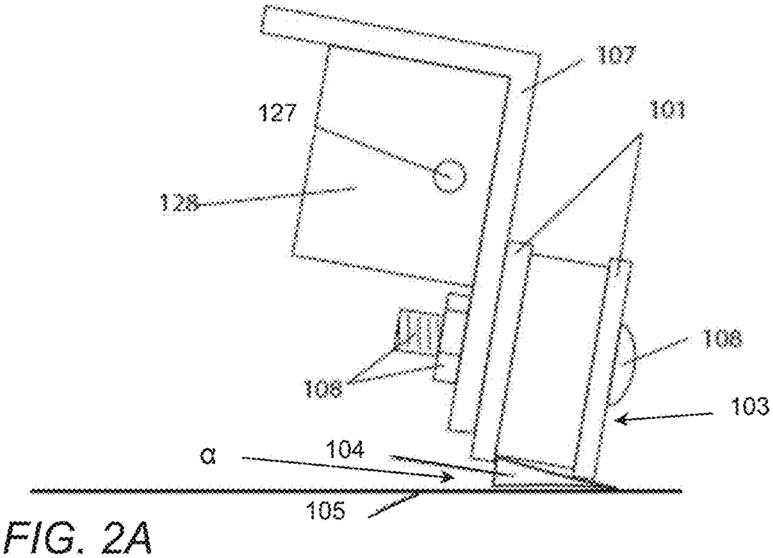
FIGS. 2A-2C are side views illustrating various positions of a magnet assembly of the knife sharpening apparatus of FIG. 1 with attached knife blades, relative to a planar sharpening surface.
Figure 2B:
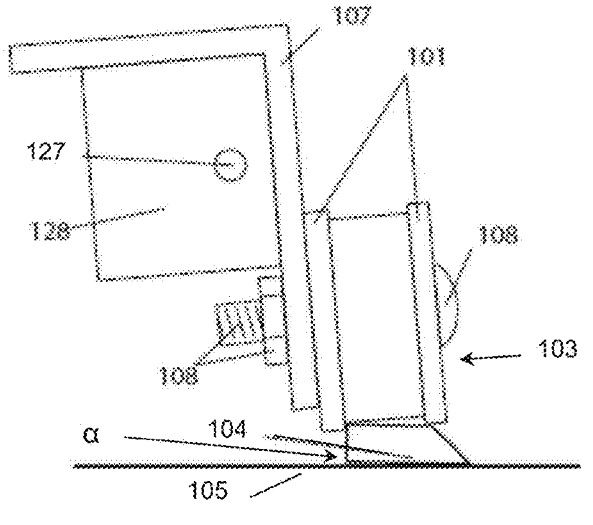
Figure 2C:
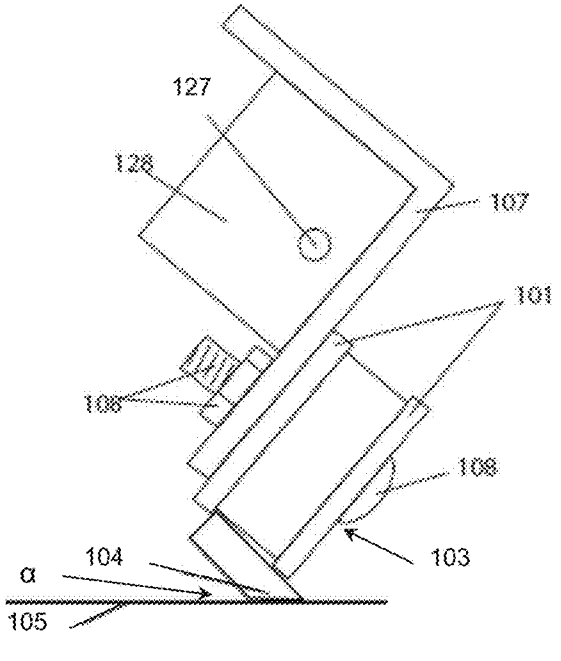

Briefly referring to FIGS. 2A-2C, depicted therein are partial views of the sharpening apparatus, particularly the magnet assembly 103 attached to the L-shaped bracket 107 of the angle adjustment assembly 96. On the lower end of magnet assembly 103 in each view is attached a magnetically attached knife blade 104 that is in partial contact with the top or upper sharpening surface of sharpening stone 105. In FIG. 2A, the knife blade represented is a double hollow-ground knife, and it would simply be flipped in order to sharpen or hone the opposite side in the same manner. In the configuration of FIG. 2A, a sharpening angle (α) of about 0 to 10 degrees may be used. In FIGS. 2B and 2C the knife is a bevel knife and is illustrated in two configurations that may be used to sharpen or hone both sides of the cutting edge-a flat side as in FIG. 2B and the beveled side as in FIG. 2C. In the configuration of FIG. 2B, a sharpening angle (α) of about 0 degrees may be used on the flat side of the blade, and in FIG. 2C a sharpening angle (α) is typically between about 30-50 degrees, depending upon the knife. In both knife configurations, the back or spine of the knife is held in magnetic contact with a first end plate 101, and a side of the blade is in contact with the second end plate 101. While the angles given for the two types of knives are typical for oboe reed knives, the sharpening apparatus provides sharpening angles of at least the useful range of 0 to 50 degrees from the face side of a knife blade to the surface of the sharpening stone. The sharpening apparatus, and particularly the angle adjustment assembly 96, is able to be adjusted from at least about −10 degrees to +50 degrees (angle β), where 0 degrees is when the L-shaped bracket extenders 130 are co-planar with the top surface of the backbone 123 (a 60 degree total range) to insure the full knife sharpening angle (α) range of about 0-50 degrees is achievable with sharpening stone thicknesses that are either less than or greater than nominal. Moreover, the larger range of angle β in the angle adjustment assembly 96 accommodates different manufacturer's knives that have a different spine thickness and also accommodates knife wear over time, which can change the sharpening angle slightly. Furthermore, the increased range of angular adjustment permits the apparatus to not only be adjusted to various knife blade configurations, but also to accommodate different thicknesses (heights) of sharpening stones. The disclosed sharpening apparatus 90 has more than the 50 degrees range needed for the knife sharpening angles, and as a result it can be easily adapted to the variations in blades 104 and sharpening stones 105. A negative angle β in the sharpening apparatus adjustment range is necessary to achieve a 0 degree sharpening angle α on the face side of a bevel knife, such as shown in FIG. 2B.

As illustrated in FIGS. 2A-2C, for example, the magnet assembly 103 is the only part of sharpening apparatus 90 that is employed to contact or hold the knife, which thereby permits achievement of a very small sharpening angle between the opposite side of the knife blade 104 and the sharpening surface of sharpening stone 105. Sharpening angles achieved with the disclosed sharpening apparatus may be as low as an inclusive angle of 0 degrees.

Continuing to refer to FIG. 1, for sharpening a double hollow ground knife (e.g., FIG. 2A) it should be understood that the knife would be removed from the hold of the magnet assembly 103, and rotated 180 degrees, so that knife handle 106 is then on the other side of the magnet assembly, in order to sharpen the other side of the knife blade 104.

The magnet assembly 103 is fastened to the longer side of an L-bracket 107 by magnet assembly mounting fasteners 108, such as screws with nuts and washers. A handle 109 on the sharpening apparatus 90 is used to move the apparatus and the magnetically attached knife blade 104 along the length of the upper sharpening surface of sharpening stone 105, and it will be appreciated that if the length of the knife blade 104 (tip to heel) is greater than the width of the sharpening stone, the knife blade may also be moved from side to side to sharpen the entire blade by sliding bearing block 113 along axle 133 while the knife blade is drawn over the sharpening stone 105. The sharpening apparatus handle 109 is fastened to the longer side of the L-shaped bracket 107 by fasteners 110, such as handle attachment screws as depicted. The size of handle 109 is approximately 3 inches by 1.5 inches by 0.125 inches thick and is mounted to the L-shaped bracket such that there is about 1 inch of the handle extending above the L-shaped bracket 107 while being centered on the L-shaped bracket. It should be noted that, by design, the handle of the knife is not touched or held by the user while sharpening the knife blade, in order to avoid the application of uneven pressure between the blade edge and the sharpening surface as the blade 104 is drawn over the sharpening stone.

Figure 3:
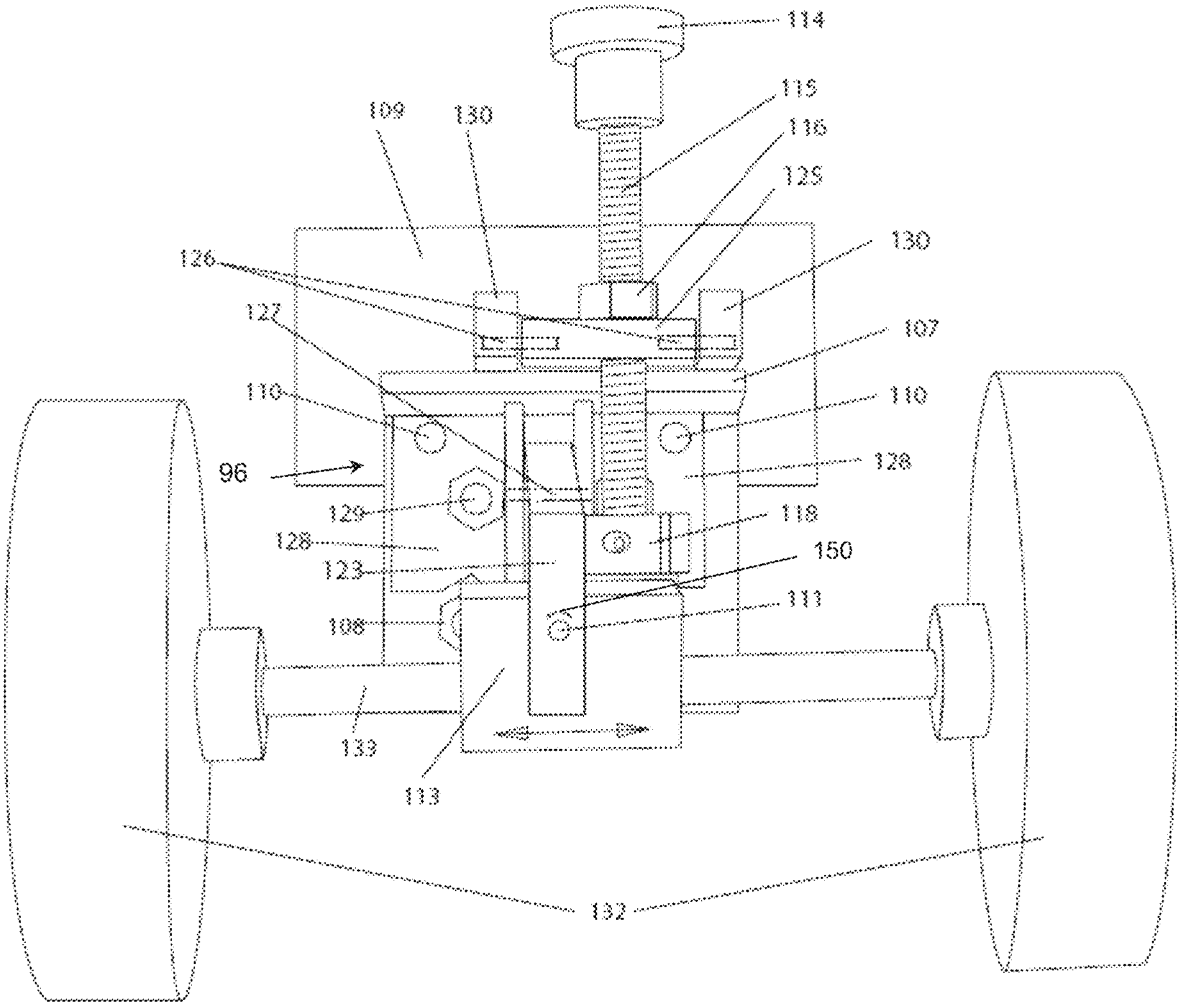
FIG. 3 is an end view of the knife sharpening apparatus of FIG. 1.
Figure 4:
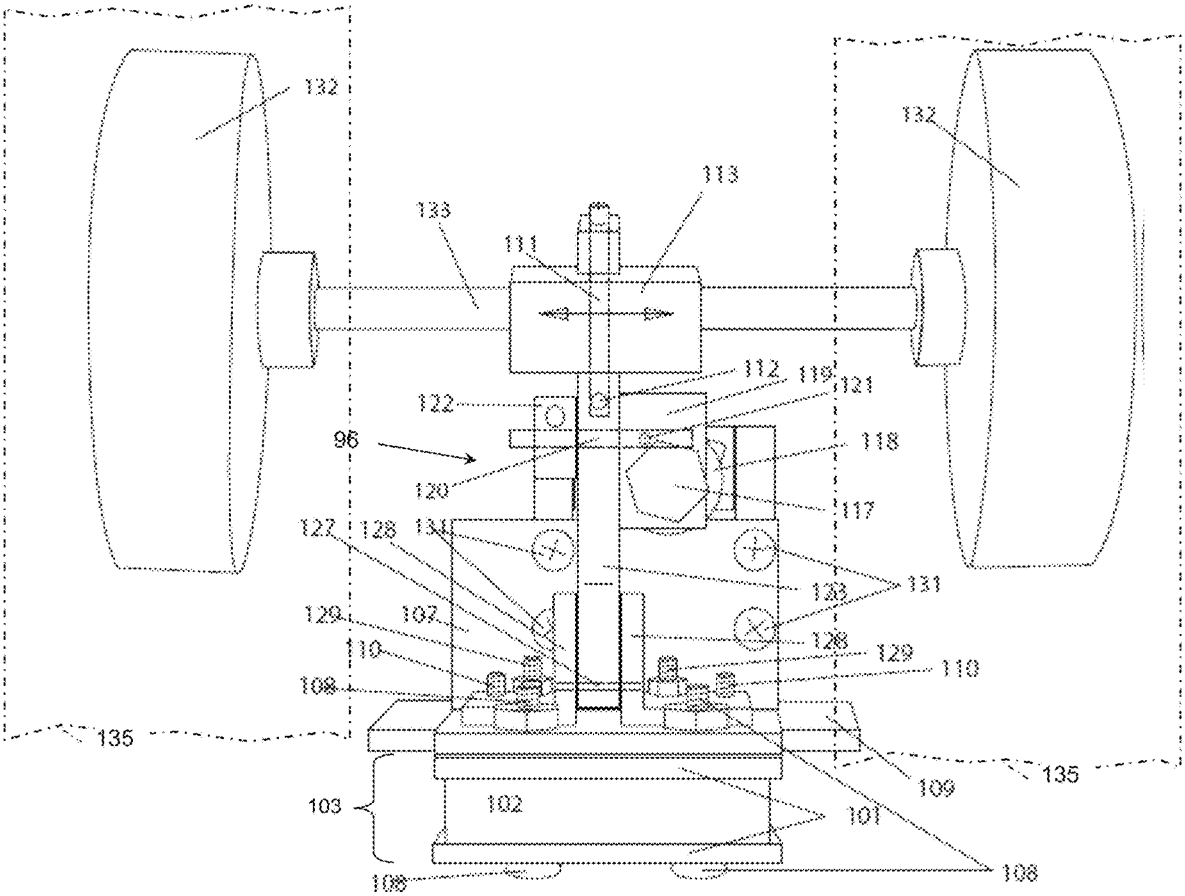
FIG. 4 is a bottom view of the knife sharpening apparatus of FIG. 1.

Also considering FIGS. 3 and 4, the carriage assembly 92 of sharpening apparatus 90 has a pivot 111 that allows for rotational motion as depicted by arrows 150. Allowing for rotation of the carriage assures that the entire length of the knife blade 104 will stay in contact with the upper sharpening surface in the event the thickness of the sharpening stone varies from side to side. And while allowing the magnet assembly 103 and attached knife blade 104 to pivot, the apparatus maintains the set sharpening angle (α) between the knife blade and the sharpening stone. A set screw 112 (FIG. 4) holds the rod serving as pivot 111 in place. It is often the case that the sharpening surface of the sharpening stone is slightly askew relative to the surface that the sharpening apparatus travels over, or the surface is not perfectly flat or is not perfectly parallel to the bottom of the stone, side to side. The use of pivot 111 is required to allow the knife blade to rock end to end and thereby maintain contact with an askew or uneven sharpening surface all the way across the stone, all the while maintaining the sharpening angle between the knife blade and the sharpening surface substantially constant.

The carriage assembly further includes a wheel 132 on each end of an axle 133 that spans the sharpening surface of sharpening stone 105 in one embodiment. Use of wheels facilitates easy travel of the sharpening apparatus 90, and an attached knife blade 104, along the sharpening stone and also to keep the set sharpening angle consistent through the knife sharpening stroke. It will be further appreciated that while the depicted sharpening apparatus 90 employs a two-wheeled carriage, there are other configurations that are possible. For example, it may be possible to replace each of the wheels with a slide or other reduced-friction surface that allows the carriage to continue to straddle or span the sharpening stone 105 yet reciprocally move over the sharpening stone 105 along the longitudinal axis 170.

Figure 5:
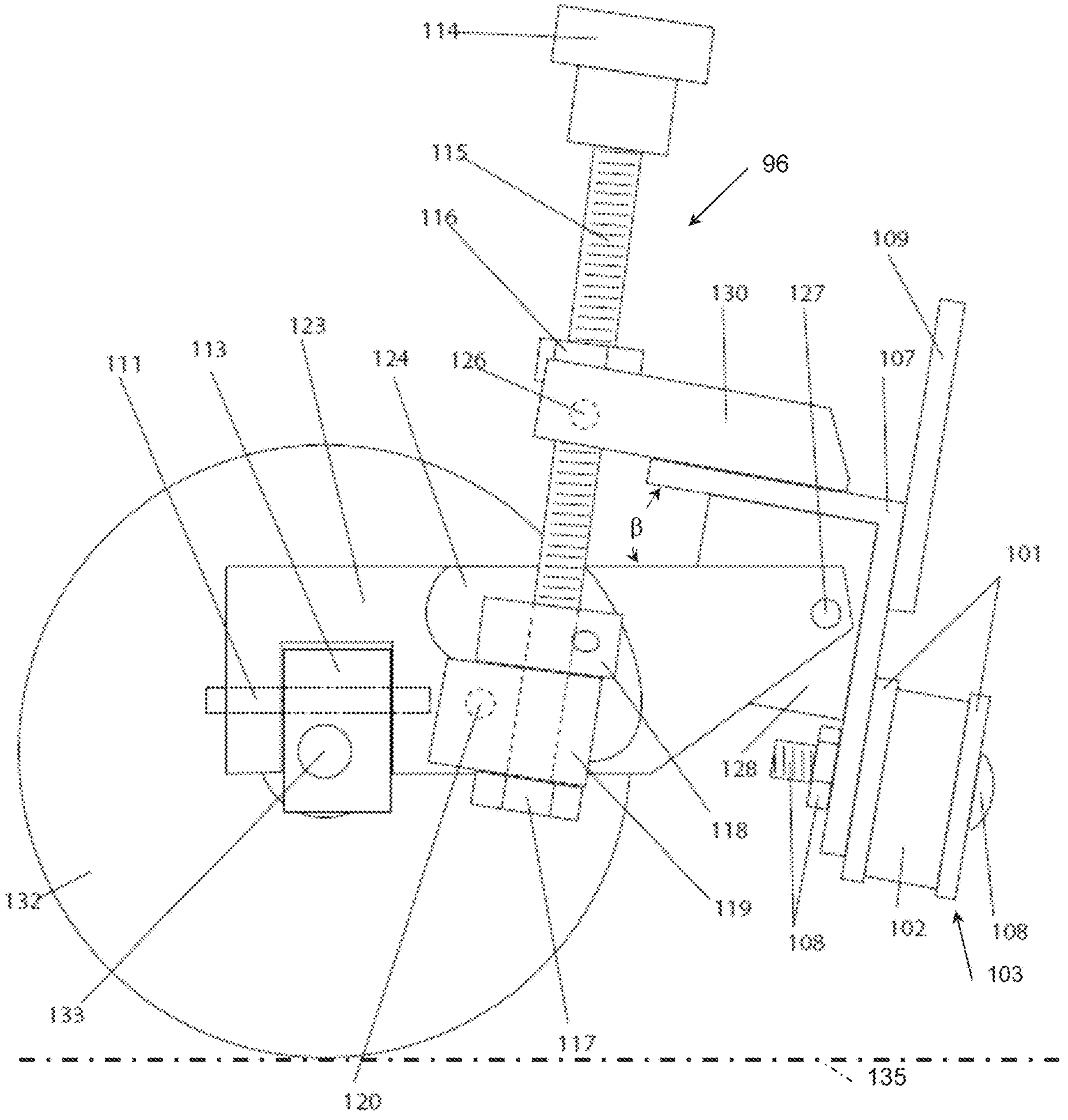
FIG. 5 is a cut-away side view of the knife sharpening apparatus of FIG. 1 illustrating the sharpening angle adjustment mechanism.

Further considering the illustration of FIG. 3, for example, the carriage assembly 92 of sharpening apparatus 90 includes a sliding bearing block 113 operatively associated with axle 133 and angle adjustment assembly 96. Sliding of bearing block 113 along axle 133 permits the adjustment assembly 96, the magnet assembly 103, and thus the attached knife blade 104 to be moved between tip and heel across the width of the sharpening stone as the knife travels under control of the carriage assembly 92 along the length of the stone. As shown in FIG. 5, movement of the top of the sliding bearing block 113 is provided by a clearance cutout in the backbone member 123, which allows the axle to pivot on the order of +/−10 degrees on pivot 111.

The disclosed configuration maintains the set sharpening angle between the knife blade 104 and the sharpening surface of sharpening stone 105. This feature is advantageous to sharpen the entire length of a knife blade, particularly when the blade length is greater than the sharpening surface width, by moving the knife blade laterally across the sharpening stone as the knife blade is drawn longitudinally along the length of the sharpening stone.

The sharpening apparatus 90 depicted in the figures has a sharpening angle adjustment assembly 96 that permits the sharpening angle, between the lower side of the knife blade 104 and the sharpening surface of the sharpening stone 105 to be adjusted anywhere from about 0 degrees to 50 degrees. In the embodiment illustrated, three pivots (120, 126 and 127) are employed in a triangular configuration to control the angle β (FIG. 5), and thereby sharpening angle α, using the adjustment knob 114. This adjustment assembly 96 employs a threaded bolt 115 to adjust the knife angle by adjusting the height of one side of the triangle, or the top portion of the adjustment assembly, relative to the lower portion of the adjustment assembly that is pivotally attached to the carriage 92.

It will be appreciated that while the adjustment assembly described herein includes three pivots, the functionality of the angle adjustment assembly 96 may be similarly achieved with a single pivot such as pivot 127, and a mechanical means to adjust and control the separation of the "arms" of the angle adjustment assembly (e.g., backbone member 123 and collectively mounting bracket 128, L-shaped bracket 107 and L-shaped bracket extenders 130.) Examples of such mechanical means could include: (a) a spacer that is adjustably moved along one of the arms so that when advanced the angle between the arms increases, where retraction of the spacer decreases the angle between the arms, and (b) an arcuate member extending from one arm (e.g., the backbone) and releasably locked to the other arm at a desired angle.

Returning to the illustrated embodiment, also included with the adjustment assembly 96 is a locking nut 116, which is used to retain threaded bolt 115 at a desired position within the threaded hole of upper pivot bracket 125, and thereby maintained the desired sharpening angle. The threaded bolt 115 is long enough to allow for adjustment of a full range of sharpening angles needed to cover both sides of double hollow ground and bevel knives. In the adjustment assembly 96, threaded bolt 115 is also restrained at the bottom end by its head 117 below, and a clamping shaft collar 118 above, a lower pivot block 119. The lower pivot block is pivotally connected, using pivot rod 120, to the backbone member 123. Backbone member 123 is approximately 3.25 inches long, 1.0 inches high and 0.25 inches thick. The pivot rod 120 is secured by a set screw 121 in the lower pivot block 119, passes through backbone 123, and is held in a pivoting relationship by a clamping shaft collar 122 on the other side of the backbone. The backbone 123 of the sharpening tool may also include a recessed area 124 to accommodate the diameter of the threaded bolt clamping shaft collar 118. When turning threaded bolt 115 using handle 114 affixed to the upper end, the threads of the threaded bolt turn in the threaded upper pivot bracket 125 and precisely adjust the distance of the upper pivot 126 to the lower pivot rod 120 in the lower pivot block 119, thereby changing the angle of the magnet assembly 103 and thereby the sharpening angle α of the knife blade 104 relative to the sharpening stone 105 (particularly the stone's top sharpening surface). In other words, the threaded upper pivot bracket 125 moves to adjust angle β and thus the sharpening angle α in response to the turning of bolt 115. One angle adjusting pivot rod 127, which with its pair of mounting brackets 128, connects the backbone to the longer side of the L-shaped bracket 107. Fasteners 129, such as screws/nuts, hold or affix the mounting bracket(s) 128 to the L-shaped bracket 107, and also hold the pivot rod 127 in its place by their location just beyond the ends of the pivot rod 127. The upper pivot rods 126 are operatively connected to the shorter side of the L-shaped bracket 107 by L bracket extender(s) 130 using fastening screws 131.

In one embodiment sharpening apparatus 90, as depicted in FIG. 1, may also use one or more flat spacers or shims 134, preferably of a non-compressible material, under the sharpening stone or under both wheels. Use of such spacers or shims allows the user to easily change the relative spacing between the sharpening apparatus 90, and the sharpening surface of the stone 105, thereby also changing the sharpening angle. Such a configuration may be of benefit when a user employs different sharpening stones while going through a sharpening sequence. Although not required to achieve the knife sharpening angle (α) range of about 0-50 degrees, the use of a spacer(s) or shim(s) 134 is a convenient and quick way to adjust the sharpening angle to a slightly different angle as a series of progressively finer sharpening surfaces are used to sharpen the knife edge. In other words, use of spacer(s) or shim(s) may alleviate the need to adjust the angle β for the sharpening angle adjustment assembly 96 between sharpening stones. Also, the different fineness (grit) sharpening stones used in the sharpening process are typically slightly different thicknesses and it may be easier and faster to have dedicated flat spacer/shim(s) for each stone to compensate for the differences than to readjust the sharpening angle of the apparatus 90 for each stone.

The spacer or shim may be added under the sharpening stone to easily and precisely control the difference in height between the sharpening surface of sharpening stone 105 and the carriage assembly 92, and in turn the sharpening angle between the front and back side of the knife without further adjusting the sharpening apparatus 90. In one method of use, a dedicated flat spacer/shim for use with a knife's front side versus the knife's back side is typically the same for all sharpening stones used. As noted above, insertion of a flat spacer or shim 134 under the sharpening stone will decrease the angle between the knife blade and the sharpening stone, whereas insertion of a spacer(s) or shim(s) under each of the two wheels will increase the sharpening angle.

In the embodiments illustrated, a flat spacer(s) may be placed under the wheels 132 or under the sharpening stone 105, if needed. While dimensions of the various components in the carriage 92, the adjustment assembly 94 and the magnet assembly 103 have a bearing on the spacing and angle achieved by sharpening apparatus 90, in the illustrated embodiment, the top sharpening surface of the sharpening stone is approximately 0.625-inches higher than the surface that the wheels ride on. This is because the depicted embodiment of the sharpening apparatus is designed for a native sharpening stone thickness/height of about 0.625 inches. These relatively thick flat spacers make the sharpening apparatus fully functional for most any flat sharpening stone thickness/height. Thicker sharpening stones from some manufacturers require appropriately sized thick flat spacers to go under the wheels for the wheels to ride on, and thinner sharpening stones from other manufacturers require an appropriately sized thick flat spacer to go under the sharpening stone. The sharpening apparatus is the same for any of the flat sharpening stones but the additional relatively thick spacers are sized specifically for the thickness/height of a manufacturer's sharpening stones that are not approximately 0.625 inches thick, to enable the sharpening apparatus' full knife sharpening angle range of 0 to 50 degrees on a wide variety of different thickness sharpening stones. Notably, if spacers need to go under the wheels, then the same thickness spacer needs to go under both wheels.

As will be appreciated, the sharpening apparatus 90 is sized to work with standard sharpening stones and steel blade knives typically used for scraping double reeds. The dimensions generally set forth herein for the sharpening apparatus are exemplary and based upon the disclosed embodiments. While the disclosed embodiment provides features to handle a range of knives, it will also be appreciated that various dimensions may be adjusted or modified as necessary for the apparatus to be used with different stones, knives, etc. For example, while the sharpening angle adjustment mechanism 96 separates the pivots 120 and 127 by a distance between about 1.5 inches and 1.75 inches, a greater separation between the pivots would result in a smaller or finer angle adjustment for each turn of the threaded adjustment bolt 115, whereas a smaller separation between such pivots would result in a larger or coarser angle adjustment.

Mounting brackets 128 provide a right angle and are approximately 0.125 inches thick with an outside size of 0.75" by 0.75" by 1" long to straddle the backbone 123 and keep it in alignment with the L-shaped bracket 107. The L-shaped bracket 107 is about 2 inches wide and 0.125 inches thick with the longer front side at about 1.72 inches and shorter top side at about 1.3 inches, both measurements being from the outside corner. The magnet assembly 103, mounted to the L-shaped bracket 107, is mounted about 0.1 inches below the edge of the longer front side of the L-shaped bracket. As the L-shaped bracket 107 controls the orientation angle of the magnet assembly 103 attached thereto, and thereby the sharpening angle ($\alpha$), the bracket also rotates over an angular range 13 from about −10 degrees to +50 degrees (where here 13=0 degrees is horizontal or co-planar with the top surface of the backbone 123) in response to rotation of the aforementioned threaded bolt 115. the range of angle $\beta$ is intentionally slightly larger than the desired range of the knife sharpening angle ($\alpha$) to allow for differences in the thickness of various manufacturer's sharpening stones plus any flat spacer(s) 134 or 135 used to correct for the native thickness of a sharpening stone deviating from the desired thickness of 0.625", knife blade configuration, angles and dimensions of knife blade 104 (e.g., the spine thickness variation between blades), knife blade wear and the manner in which the knife is removably attached to the magnet assembly 103.

The diameter of the wheels 132 are critical to establishing the sizes and positions of the remaining components of carriage assembly 92, and to a similar extent, the balance of the components in the sharpening apparatus 90. In the embodiments depicted, the wheels 132 have about a 3.0 inch diameter, and are held in position with a common clamping shaft collar placed on axle 133 on the inside of each wheel and a side-mount external retaining ring on the axle in a groove located outside of the wheel. Axle 133 is about 6 inches long and has a 0.25 inch diameter.

Although various thicknesses may be used, the flat spacer or shim(s) 134 may include a full range of thicknesses from about 0.003" through 1" and larger in order provide whatever is required by the thickness of the sharpening stone(s) 105 relative to the sharpening apparatus 90—to properly position the knife blade on the sharpening stone thereby allowing for the apparatus' full sharpening angle (a) range of 0 to 50 degrees. As noted previously, the use of spacers or shims 134 may facilitate the quick substitution of sharpening stones or surfaces while maintaining the relationship between the knife blade and the sharpening stone.

This detailed description in combination with the figures is intended principally as a description of the various elements of the sharpening apparatus 90, and is not intended to represent the only form in which the sharpening apparatus may be constructed or utilized. The description presents the designs, functions and methods of implementing the sharpening apparatus in accordance with the illustrated parts. It is to be understood that the same or equivalent functions and features may be accomplished by different parts that are also intended to be within the spirit and scope of the stated claims.

As will be further appreciated, sharpening apparatus may be employed in accordance with a particular method for sharpening knives. One method for holding a knife for sharpening a knife with the disclosed sharpening apparatus 90, comprises placing a carriage 92 of the sharpening apparatus adjacent a sharpening surface of a sharpening stone 105, the carriage having wheels, a slide or other means suitable for reciprocal movement along a longitudinal axis of, yet above, the sharpening surface. A knife is then attached to a magnet assembly 103 of the sharpening apparatus 90 to securely hold the knife by magnetic attraction of a first side of the knife blade 104 to the magnet assembly. Next, an angle adjustment assembly 96, which adjustably connects the magnet assembly 103 to the carriage 92, is used to adjust a sharpening angle ($\alpha$) between a second side of the knife blade that is to be sharpened and the flat sharpening surface.

While various configurations are possible, in one embodiment the carriage 92 is assembled to include at least two wheels 132, an axle 133 spanning between yet rotatably coupling the wheels, where each of the wheels is positioned to roll along opposite sides of the sharpening surface of sharpening stone 105. A sliding bearing 113 is placed around the axle between the two wheels, the sliding bearing permitting both rotation of the axle within the bearing as well as linear translation of the bearing over at least a portion of the length of the axle. This feature allows for sharpening of a knife having a blade 104 with a length greater than the width of the sharpening surface—enabling the knife to be translated between blade tip and blade heel as the knife is drawn along the sharpening surface while magnetically attached to the sharpening apparatus 90 to maintain the sharpening angle ($\alpha$).

The method of using the sharpening apparatus also includes an angle adjustment assembly that adjusted to set the sharpening angle ($\alpha$). And the relative position between the apparatus 90 and the sharpening stone 105 may be further adjusted or controlled by adjustment of the relative separation between the axle 133 and the sharpening surface by placing at least one shim or spacer 134 under the sharpening surface and/or under each of the at least two wheels 132.

To use the sharpening apparatus 90, the sharpening angle ($\alpha$) can be adjusted by one or more methods. As described above, one method is use of a non-compressible shim(s) or spacer(s) 134 to evenly adjust the relative position between the sharpening stone surface and the knife blade 104 to be sharpened. Generally, the size of the spacers should be the same as the footprint of sharpening stone 105 that they are to be placed beneath.

Alternatively, strips of non-compressible material 135 can be put under both wheels of the sharpening apparatus 90 to increase the angle between the knife blade and the sharpening stone. Note that the strips need to be wide enough and long enough, so the wheels do not travel off the strips when the sharpening apparatus is reciprocally moved along the longitudinal axis 170. Generally, a size of about 2.75 inches wide by 12 inches long is believed sufficient, and equal height spacers 135 are used under both wheels.

In another method described briefly above, the sharpening angle ($\alpha$) may be adjusted using the angle adjusting knob 114 on threaded rod 115. In the embodiment depicted, one full turn of the knob results in an approximately 2 degrees of sharpening angle adjustment. Once adjusted to the desired angle, only finger tighten locking nut 116 to hold angle adjustment assembly 96 in place.

Figure 6A:
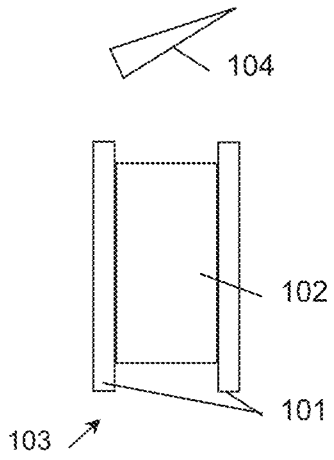
FIGS. 6A-6D are illustrative examples of the positioning and detachment of a knife blade relative to a magnet assembly used to hold the knife blade during sharpening.
Figure 6B:
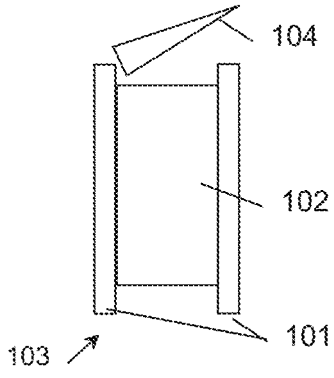
Figure 6C:
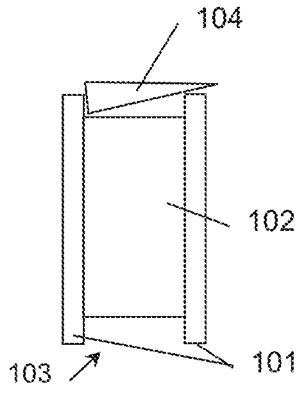
Figure 6D:
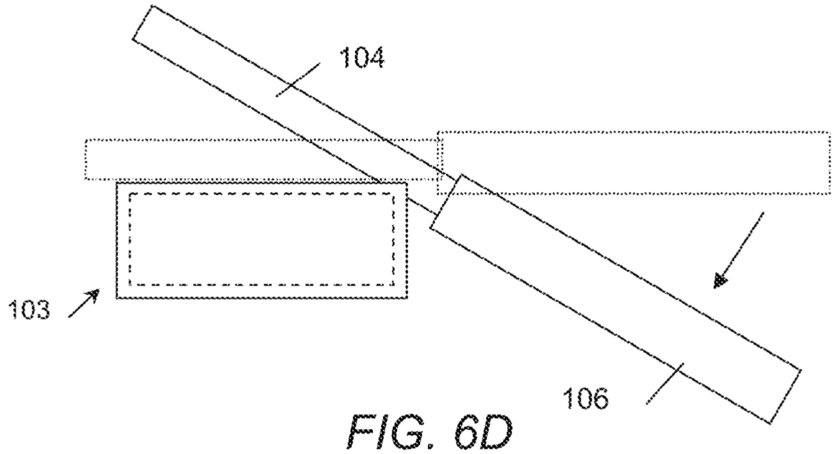

Considering the mounting of the knife blade 104 to the magnet assembly 103, reference is made to the sequence of illustrations as set forth in FIGS. 6A-6C. When mounting a knife blade 104 to the magnet assembly 103 of the sharpening apparatus 90, securely hold the tool upside-down in one hand with the knife holder away from the operator and hold the knife handle (not shown) in the other hand with the sharpened edge of the blade facing up and slightly away from the operator (FIG. 6A). Lower the back or spine of the knife blade 104 into a position where the blade's spine contacts upper edge and inner face of the leftmost magnet plate 101 (FIG. 6B). Then, let the blade 104 rotate down to the position where a face of the blade is in contact with the other magnet plate 101 (FIG. 6C). At this point the knife blade 104, indeed the entire knife, should be held firmly in position. Make note that the direction of the knife handle determines if the face or back side of the blade will be against the sharpening stone. Removal of the knife blade from the magnet assembly 103 may be accomplished in a manner depicted in FIG. 6D, by applying a force in the direction of the arrow to the knife handle 106 to "pivot" the blade away from linear contact along the blade spine with the magnet assembly 103. Once the linear contact is "broken" the handle may be used to move the knife away from the magnet.

Figure 7:
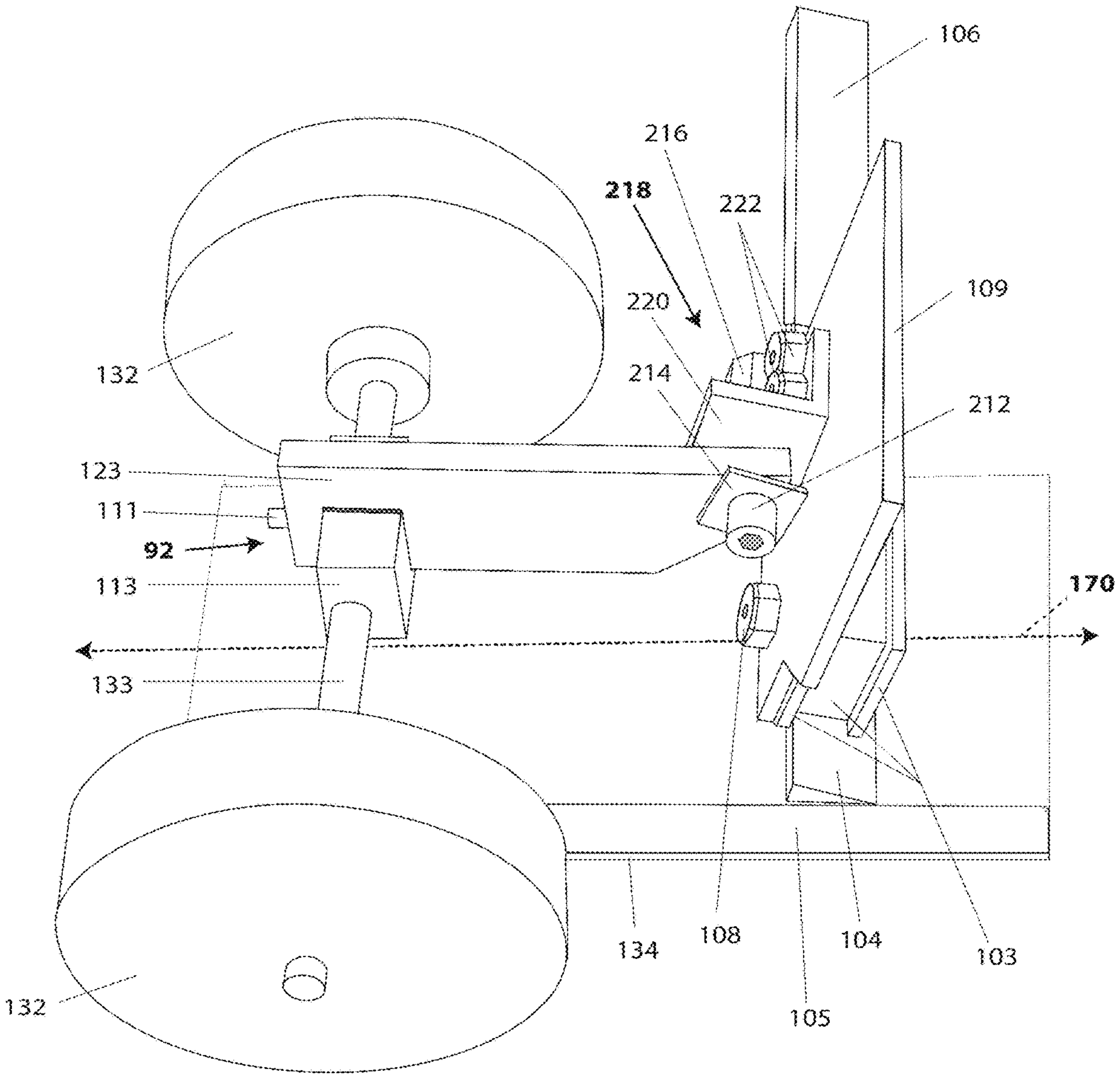
FIG. 7 is a perspective view illustrating an alternative embodiment of the knife sharpening apparatus.
Figure 8A:
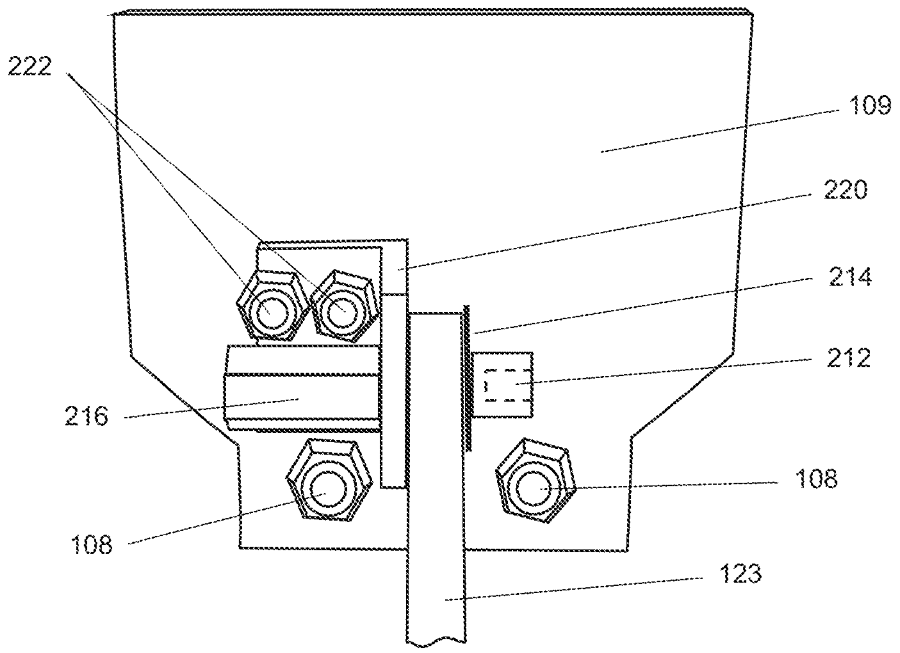
FIGS. 8A and 8B are, respectively, back and perspective side views of one manner of connecting the backbone to the connecting bracket and handle of the angle adjustment assembly.
Figure 8B:
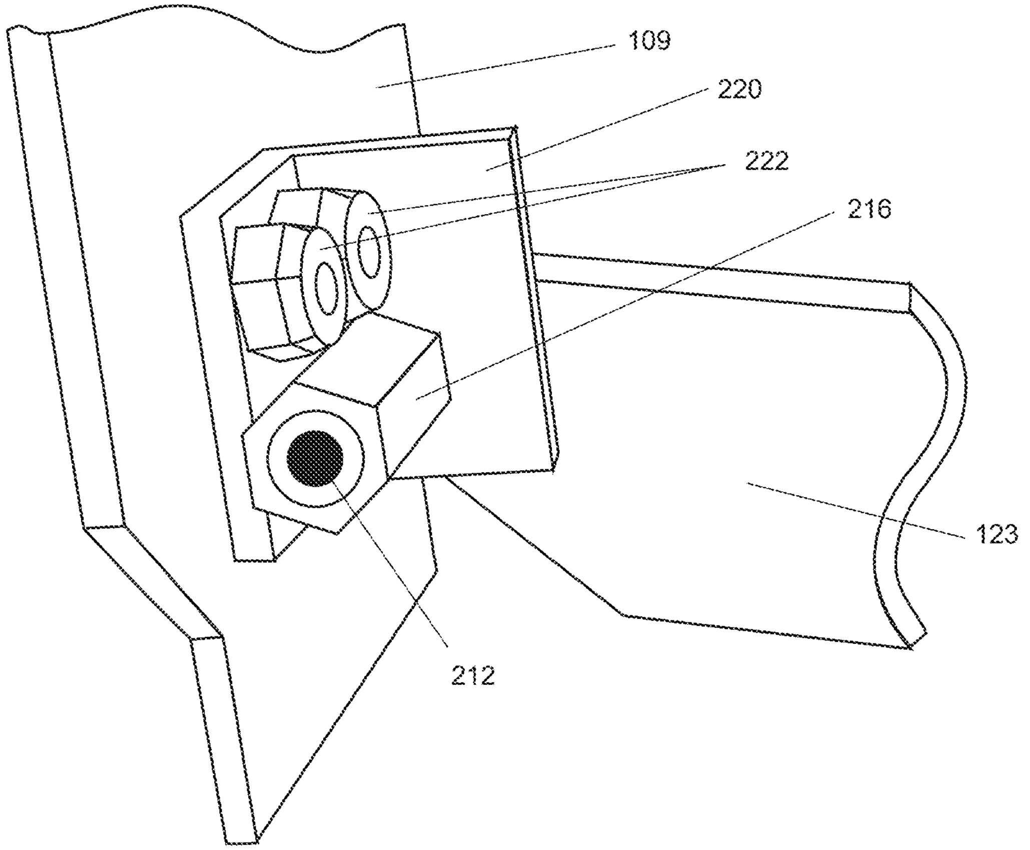
Figures 9A, 9B, 9C:
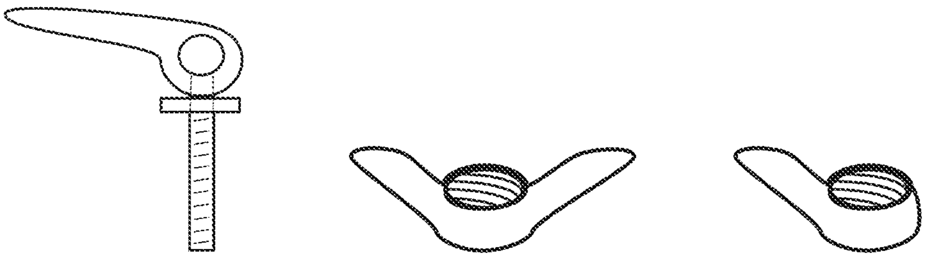
FIGS. 9A-9C are illustrations of components that may be employed for alternate tightening-loosening of the pivoting connection depicted in FIGS. 8A and 8B.

An alternative embodiment of the knife sharpening apparatus is depicted in FIG. 7, with details of a releasable lock assembly depicted in FIGS. 8A and 8B. FIGS. 9A-9C provide further detail on several alternative components for use with the releasable lock assembly of FIGS. 7-8B. Referring to FIGS. 7-9C, the alternative embodiment modifies the manner in which the sharpening angle is adjusted and locked in place. In the embodiment of FIG. 1 small and repeatable knife sharpening angle changes may be accomplished using the adjustment knob 114 at the end of threaded bolt 115, with the sharpening angle being secured by locking nut 116.

The embodiment illustrated, for example in FIG. 7 is less complicated to fabricate, so will cost less to fabricate. Furthermore, embodiment of FIG. 7 employs a single threaded member such as screw 212 to both pivotally connect the backbone 123 of the carriage 92 in relation to the magnet assembly 103 and its associated handle 109 as well as to lock the relative angle between the backbone and handle members once adjusted. Screw 212 may be loosened to adjust the sharpening angle, and then tightened to lock the sharpening angle (including the orientation of the backbone 123 in relation to the handle 109 of angle adjustment assembly 218). Screw 212 also functions as pivot 127 and the need for pivots 120 and 126 in the embodiment of FIG. 1 is eliminated. As a result of the modifications as seen in FIG. 7, the alternative embodiment of FIG. 7 also has a slightly enlarged range of angles possible at screw 212. The increased angular range afforded by the alternative embodiment also permits a wider range of thicknesses in the sharpening stones 105 that may be employed with the apparatus before needing to add flat spacer(s) or shim(s) 134 or 135 under either the sharpening stone 105 or sharpening apparatus wheels 132.

For example, the embodiment of FIG. 7 can be used directly with either a 0.375" or 0.625" thick sharpening stone and does not need a spacer under the 0.375" thick sharpening stone to bring it up to the nominal 0.625" thickness as may be required for the embodiment of FIG. 1. Both embodiments achieve the full sharpening range of 0° to 50° between the side of the knife blade 104 and the surface of the sharpening stone 105. With the embodiment of FIG. 7 the magnet assembly 103 is bolted directly to the handle 109, which is appropriately larger in the downward direction, and thereby eliminates the need for a the larger L-shaped bracket 107 found in the embodiment of FIG. 1. Instead, a smaller L-shaped connecting bracket 220 is employed as will be further described below. Thus, the angle adjustment assembly 218 is an alternative to angle adjustment assembly 96 of FIG. 1.

As illustrated in FIGS. 7 and 8A-8B, screw 212 functions both as pivot 127 and as part of the sharpening angle position locking mechanism. The angle adjustment assembly 218 adjusts and holds the magnet assembly 103 and connecting bracket 220, along with its handle 109, securely in position with respect to the backbone 123 to lock the relative angle between the components and thereby controls the desired sharpening angle. A high-profile hex socket head screw is shown in the diagram as a cap screw 212, In the case of the cap screw, an Allen wrench may be used to turn the cap screw and tighten or loosen the pivot connection. As will be appreciated, any of a variety of equivalent threaded members or screws could be used, including a quick release clamping cam handle threaded stud as illustrated in FIG. 9A. Similarly, the wing-nut of FIG. 9B and single-wing nut of FIG. 9C may also be employed to facilitate the tightening and loosening of the screw 212 in order to easily lock the components of the sharpening apparatus in a relationship to achieve the desired sharpening angle.

An optional washer 214 protects the backbone 123 from wear with repeated loosening and tightening of the screw 212. The washer 214 shown is large enough and has at least one flat or straight side on its perimeter, oriented toward the back surface of the handle 109 to limit its rotation during the loosening and tightening of screw 212 and makes it easier to maintain the desired sharpening angle as the screw 212 is tightened. Once the end of a straight side of washer 214 touches the back surface of the handle 109 washer 214 will not turn with the screw 212 as the screw 212 is tightened, which essentially prevents the sharpening angle from changing as the screw 212 is tightened.

A nut 216 or a similar internally-threaded member is what screw 212 threads into to securely lock the sharpening angle by clamping the backbone 123 to the connecting bracket 220. Nut 216 may be a long nut for extended thread contact with screw 212, which allows for significant tightening to secure the sharpening angle with minimum risk of stripping the threads of either the screw 212 or nut 216. One side of nut 216 can sit or impinge against connecting bracket 220 such that the connecting bracket 220 prevents the nut 216 from turning when screw 212 is loosened or tightened, and thereby negating the need to use a wrench on the nut 216. While a long nut 216 is shown in the diagram, equivalent nuts could be used such as a shorter standard nut, a wing nut or a single-wing nut shown below. As noted above, it may also be possible to employ an internally threaded member, or even provide such threads in the hole in connecting bracket 220 through which the screw 212 passes.

Connecting bracket 220 is attached to the handle 109 by mounting means such as fasteners 222, which may be conventional screws with nuts and washers. As the connection of the connecting bracket 220 to the handle 109 is intended to be permanent, locking-type fastener components may be used, or the components may be attached to one another using alternative techniques such as gluing, welding or brazing to facilitate assembly. Connecting bracket 220 is what backbone 123 locks against, using screw 212 and nut 216. Handle 109 is appropriately larger in the downward direction in the embodiment of FIG. 7 such that the magnet assembly 103 is fastened directly to the handle 109 by mounting with fasteners 108.

It should be understood that various changes and modifications to the embodiments described herein will be apparent to those skilled in the art. Such changes and modifications can be made without departing from the spirit and scope of the present disclosure and without diminishing its intended advantages. It is therefore anticipated that all such changes and modifications be covered by the instant application.

What is claimed is:

1. An apparatus for holding a knife for sharpening, the knife having a blade with a first and second sides extending from a spine along a back surface of the blade and meeting at a linear cutting edge, the apparatus comprising:

a magnet assembly for securely holding the knife only by magnetic attachment to the blade of the knife, said magnetic attachment occurring only along the first side of the knife blade and adjacent spine thereof, without further means to hold the knife;

a carriage for reciprocal movement above a flat sharpening surface parallel to a longitudinal axis of the flat sharpening surface; and an angle adjustment assembly, pivotally connecting the magnet assembly to the carriage, the angle adjustment assembly further establishing, at a pivot point, a first angular relationship between the magnet assembly and the carriage, and wherein the angle adjustment assembly further incudes a releasable lock at the pivot point to lock a sharpening angle after adjustment;

wherein the carriage includes:

two wheels;

one axle rotatably coupled to and separating the wheels, where each of the wheels is positioned to roll along opposite sides of the flat sharpening surface; and a sliding bearing, located on the axle, permitting both rotation of the bearing about the axle, thereby establishing a second angular relationship, and linear translation of the bearing over at least a portion of the length of the axle, thereby enabling the knife blade to be translated between tip and heel as drawn along the flat sharpening surface while maintaining the sharpening angle, where the adjustment of the sharpening angle between the second side of the knife blade and the flat sharpening surface is achieved as a combination of the first angular relationship and the second angular relationship, and thereby enables adjustment of the sharpening angle along the linear cutting edge to a minimum of at least 0 degrees.

2. The apparatus according to claim 1, wherein said releasable lock includes a threaded member passing through the pivot point of said carriage and angle adjustment assembly, said threaded member having a head on one end and a threaded retaining member on an opposite end, wherein the head and threaded retaining member are threadably tightened in a manner to create a friction force between said carriage and angle adjustment assembly suitable for locking said carriage to the angle adjustment assembly.

3. The apparatus according to claim 2, wherein said releasable lock includes at least one component selected from the group consisting of: a quick-release clamping cam handle, a hex nut, a wing-nut, a locknut, a washer, a lock-washer and a single-wing nut.

4. The apparatus according to claim 1, wherein the angle adjustment assembly includes:

a plate operatively attached to the magnet assembly, the plate extending upward to provide a top edge suitable for use as a handle to move the sharpening apparatus; and a connecting bracket, attached to the plate and pivotally attached to the carriage.

5. The apparatus according to claim 1, wherein the angle adjustment assembly includes a plate operatively attached to the magnet assembly, the plate extending upward to provide a top edge suitable for use as a handle to move the sharpening apparatus, and a connecting bracket attached to the plate;

the carriage includes a backbone extending therefrom; and said releasable lock pivotally attaches the connecting bracket to the backbone of the carriage.

6. An apparatus for holding a knife for sharpening, the knife having a blade with first and second sides extending from a spine along a back surface of the blade and meeting at a linear cutting edge, the apparatus comprising:

a carriage for reciprocal movement above the flat sharpening surface and parallel with the flat sharpening surface;

a magnet assembly for securely holding the knife only by magnetic attachment to the blade of the knife, said magnetic attachment occurring only along the first side of the knife blade and adjacent spine thereof, without further means to hold the knife; and an angle adjustment assembly, operatively connecting the magnet assembly to the carriage, the angle adjustment assembly enabling the adjustment of a sharpening angle, between the second side of the knife blade that is to be sharpened and a flat sharpening surface, to a minimum of 0 degrees, and a releasable lock assembly, pivotally connecting the angle adjustment assembly and the carriage and locking the sharpening angle;

wherein the carriage further includes:

two wheels;

one axle rotatably coupled to and separating the wheels, where each of the wheels is positioned to roll along opposite sides of the flat sharpening surface; and a sliding bearing, located on the axle, permitting both rotation of the axle relative to the bearing and linear translation of the bearing over at least a portion of the length of the axle, thereby enabling the knife blade to be translated between tip and heel as drawn along the flat sharpening surface while maintaining the sharpening angle along the linear cutting edge.

7. The apparatus according to claim 6, wherein said releasable lock assembly includes a threaded member passing through the pivot point of said carriage and angle adjustment assembly, said threaded member having a head on one end and a threaded retaining member on an opposite end, wherein the head and threaded retaining member are threadably tightened in a manner to create a friction force between said carriage and angle adjustment assembly suitable for locking said carriage to the angle adjustment assembly.

8. The apparatus according to claim 7, wherein said releasable lock includes at least one component selected from the group consisting of: a quick-release clamping cam handle, a hex nut, a wing-nut, a locknut, a washer, a lock-washer and a single-wing nut.

9. The apparatus according to claim 6, wherein the angle adjustment assembly includes:

a plate operatively attached to the magnet assembly, the plate extending upward to provide a top edge suitable for use as a handle to move the sharpening apparatus; and a connecting bracket, attached to the plate and pivotally attached to the carriage.

10. The apparatus according to claim 6, wherein the angle adjustment assembly includes a plate operatively attached to the magnet assembly, the plate extending upward to provide a top edge suitable for use as a handle to move the sharpening apparatus, and a connecting bracket attached to the plate;

the carriage includes a backbone extending therefrom; and said releasable lock pivotally attaches the connecting bracket to the backbone of the carriage.

* * * * *